United States Patent
Sohail et al.

(10) Patent No.: US 10,450,201 B2
(45) Date of Patent: Oct. 22, 2019

(54) METHOD FOR THE SYNTHESIS OF NANOPARTICLES OF HETEROMETALLIC NANOCOMPOSITE MATERIALS

(71) Applicant: King Fahd University of Petroleum and Minerals, Dhahran (SA)

(72) Inventors: Manzar Sohail, Dhahran (SA); Muhammad Sharif, Dhahran (SA); Safyan A Khan, Dhahran (SA); Muhammad Sher, Dhahran (SA); Rajenahally V Jagadeesh, Rostock (DE)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 15/724,445

(22) Filed: Oct. 4, 2017

(65) Prior Publication Data
US 2019/0100440 A1   Apr. 4, 2019

(51) Int. Cl.
*C01G 49/00* (2006.01)
*C01G 55/00* (2006.01)
*C01G 23/00* (2006.01)
*C01G 51/00* (2006.01)
*C01G 53/00* (2006.01)
(Continued)

(52) U.S. Cl.
CPC .......... *C01G 49/0018* (2013.01); *C01B 33/06* (2013.01); *C01G 23/003* (2013.01); *C01G 49/0072* (2013.01); *C01G 51/40* (2013.01); *C01G 53/40* (2013.01); *C01G 55/00* (2013.01); *C25B 1/003* (2013.01); *C25B 1/04* (2013.01); *C25B 11/0415* (2013.01); *C25B 11/0426* (2013.01); *C01P 2002/72* (2013.01); *C01P 2002/85* (2013.01); *C01P 2004/03* (2013.01); *C01P 2004/04* (2013.01); *C01P 2004/64* (2013.01)

(58) Field of Classification Search
CPC .............. B01J 13/0004; B01J 13/0052; C01G 49/0018; C01G 23/003; C01G 49/0072; C01G 51/40; C01G 53/40; C01G 55/00; C01B 33/06
USPC ........................................ 502/150, 326, 349
See application file for complete search history.

(56) References Cited

U.S. PATENT DOCUMENTS 6,962,685 B2  11/2005  Sun
7,112,369 B2   9/2006  Wang et al.
(Continued)

*Primary Examiner* — Patricia L. Hailey
(74) *Attorney, Agent, or Firm* — Hauptman Ham, LLP

(57) ABSTRACT

A simple one pot sol-gel method for the synthesis of bi-metal nanostructures is based on non-noble metals (Fe, Co and Sn) and titanium. The method involves the synthesis of mixed metal nanoscale composites using low cost precursors which allow for the synthesis of desired nanocomposite materials with self-scarifying titanium or silica supports. The procedure does not require any surfactant or any need for pH controlled step. Applicants' method involves the in-situ generation of precursors and their simultaneous entrapment in a gel. This simple one pot synthesis allows for the synthesis of homogenous size, shape and distribution of targeted nanostructures. Further, this method can be applied for the preparation of various nanocomposite materials using different choices of metals and self-scarifying supports. Applicants also show that Pd, the noble metal based nanocomposite is feasible.

11 Claims, 9 Drawing Sheets
(4 of 9 Drawing Sheet(s) Filed in Color)

(51) Int. Cl.
    *C25B 1/00*     (2006.01)
    *C25B 1/04*     (2006.01)
    *C25B 11/04*    (2006.01)
    *C01B 33/06*    (2006.01)

(56) References Cited

U.S. PATENT DOCUMENTS

| | | |
|---|---|---|
| 7,128,891 B1 | 10/2006 | Sun |
| 7,407,527 B2 | 8/2008 | Hyeon |
| 7,604,680 B2 | 10/2009 | Shamblen et al. |
| 7,632,332 B2 | 12/2009 | Brooks et al. |
| 7,803,423 B2 | 9/2010 | O'Brien et al. |
| 7,867,556 B2 | 1/2011 | Pickett |
| 8,182,786 B2 | 5/2012 | O'Brien et al. |
| 8,349,964 B2 | 1/2013 | Wang et al. |
| 8,367,793 B2 | 2/2013 | Edmiston |
| 9,050,605 B2 | 6/2015 | Guo |
| 9,453,168 B2 | 9/2016 | Castillo et al. |
| 2010/0216632 A1 | 8/2010 | Adzic et al. |
| 2014/0346408 A1 | 11/2014 | Yun et al. |
| 2015/0259504 A1* | 9/2015 | Takahashi ............... C08L 67/04 523/451 |

\* cited by examiner

METHOD FOR THE SYNTHESIS OF NANOPARTICLES OF HETEROMETALLIC NANOCOMPOSITE MATERIALS

FIELD OF THE INVENTION

This invention relates to a method for the preparation of and synthesis of nanoparticles of heterometallic nanocomposite materials.

BACKGROUND OF THE INVENTION

The development of advanced nanomaterials is important and challenging for the industrial, biological and medicinal industries. Notably the nanoparticles with or without a solid support are used in a diverse range of fields such as catalysis, sensing, drug delivery, and painting technologies. Several methods are employed for the preparation of nanoparticles and fabrication of nanostructured materials, which can be broadly categorized into a) Bottom-up and b) Top-down technique.

The top-down techniques have been used to obtain bulk quantities of nanoparticles. However, the main problem with this approach is the imperfection of surface structures and significant crystallographic damage with impurities that leads to taking extra care for the design and fabrication of devices. Furthermore, the top-down techniques are limited to the preparation of only a few materials.

On the other hand, the bottom-up techniques provide an excellent control over size, shape and composition of nanoparticles, which can address the industrial needs and nanotechnology in a wide range of applications. This approach includes the wet chemical methods, inert gas phase condensation and pyrolysis. The wet chemical techniques include sol-gel methods, solvo-thermal methods, chemical vapor deposition and others. Here Applicants present the preparation of bulk nanocomposite materials by a new sol-gel and as well as by pyrolysis methods via bottom-up techniques. Using this methodology Applicants prepared a range of new nanocomposite materials ($Fe_9TiO_{15}$, $Ti_4Pd_2O$, $Sn_{0.39}Ti_{0.61}O_2$, $CoTiO_3$, $Fe_9SiO_{15}$) and their catalytic applications have been showcased. Further, Applicants' methods represent a possible solution for the preparation and scaling up of novel nanocomposite production on an industrial scale.

The synthetic challenges have limited the production of new types of nanocomposite materials in the industry. Currently, these methodologies, especially the bottom-up techniques face difficulties in producing higher quantities to reach consumer demands. Therefore, the advances in the bottom-up techniques, particularly for the production of bulk quantities of novel nanostructures is important can make a revolution in the present and new scenario of materials and nanotechnology.

A patentability search on the invention disclosed several patents of interest. To be more specific, Brooks et al. (U.S. Pat. No. 7,632,332) discloses methods of producing iron and titanium-containing nanoparticles by reducing iron and titanium-containing precursors with alkali or alkaline-earth metal-containing reducing agents in the presence of a suitable surfactant, and by the thermolysis of iron and titanium-containing precursors without alkali or alkaline-earth metal-containing reducing agents present.

Sun (U.S. Pat. No. 7,128,891) discloses a method and structure for making magnetite nanoparticle materials by mixing an iron salt with alcohol, carboxylic acid and an amine in an organic solvent and heating the mixture to 200-360° C. is described. The size of the particles can be controlled either by changing the iron salt to an acid/amine ratio or by coating small nanoparticles with more iron oxide. Magnetite nanoparticles in the size ranging from 2 nm to 20 nm with a narrow size distribution and can be readily extended to other iron oxide based nanoparticle materials, including M Fe2O4 (M=Co, Ni, Cu, Zn, Cr, Ti, Ba, Mg) nanomaterials, and iron oxide coated nanoparticle materials.

Yun et al. (U.S. Publication No. 20140346408) disclose a method of manufacturing a graphene hybrid material, comprising: preparing nanoparticles, a biomaterial solution, and a graphene oxide solution, mixing the nanoparticles with the biomaterial solution to form biomaterial-coated nanoparticles; mixing the biomaterial-coated nanoparticles with the graphene oxide solution to obtain a graphene oxide/nanoparticle hybrid material; and reducing the graphene oxide/nanoparticle hybrid material to obtain a graphene/nanoparticle hybrid material. The nanoparticles are selected from the group consisting of Au (gold), Ag (silver), Pd (palladium), Pt (platinum), Ni (nickel), Cu (copper), Ru (ruthenium), Rh (rhodamine), TiO2 (titanium dioxide), ZnO (zinc oxide), SnO2 (tin dioxide), MnO2 (manganese dioxide), Co3O4 (cobalt (II, III)), Fe3O4 (magnetite), NiO (nickel(II) oxide), Cu2O (copper (I) oxide), RuO2 (ruthenium dioxide), SiO2 (silicon dioxide), CdS (cadmium sulfide) and CdSe (cadmium selenide) (See Figures and Claims 1, 2).

Pickett (U.S. Pat. No. 7,867,556) disclose a method of producing nanoparticles comprising: effecting conversion of a nanoparticle precursor composition to a material of the nanoparticles, the precursor composition comprising a first precursor species containing a first ion to be incorporated into the nanoparticles and a second precursor species containing a second ion to be incorporated into the nanoparticles, the conversion being effected in the presence of a molecular cluster compound under conditions permitting seeding and growth of the nanoparticles, by dispersing the molecular cluster compound and an initial portion of the nanoparticle precursor composition which is less than the total amount of the nanoparticle precursor composition to be used to produce the nanoparticles in a suitable dispersing medium at a first temperature; increasing a temperature of the dispersing medium containing the cluster compound and precursor composition to a second temperature sufficient to initiate seeding and growth of the nanoparticles on the molecular clusters of the molecular cluster compound; and adding at least one further portion of the nanoparticle precursor composition to the dispersing medium containing the nanoparticles, wherein the temperature of the dispersing medium containing the nanoparticles is increased at least before, during, or after the addition of the at least one further portion of the nanoparticle precursor composition.

General Background

The development of advanced nanomaterials is important and a challenge for the industrial, biological and medicinal applications. Notably the nanoparticles (NPs) with or without a solid support are used in a diverse range of fields such as catalysis, sensing, drug delivery, and painting technology. Several methods are employed for the preparation of NPs and fabrication of nanostructured materials, which can be broadly categorized into a) Bottom-up and b) Top-down techniques. The top-down techniques have been used to obtain bulk quantities of NPs. However, the main problem of this approach is the imperfection of surface structures and significant crystallographic damage with impurities that leads to take extra care and challenge for the design and fabrication of devices. Furthermore, the top-down techniques are limited to the preparation of only few materials.

On the other hand, the bottom-up techniques provide an excellent control over size, shape and composition of nanoparticles, which can address the industrial needs and nanotechnology in a wide range of applications. This approach includes the wet chemical methods, inert gas phase condensation and pyrolysis. The wet chemical techniques include sol-gel methods, solvo-thermal methods, chemical vapor deposition and others. Here we present the preparation of bulk nanocomposite materials by a new sol-gel and as well as by pyrolysis methods via bottom-up techniques. Using this methodology we prepared a range of new nanocomposite materials ($Fe_9TiO_{15}$, $Ti_4Pd_2O$, $Sn_{0.39}Ti_{0.61}O_2$, $CoTiO_3$, $Fe_9SiO_{15}$) and their catalytic applications have been showcased. Further, our method represents a possible solution for the preparation and scaling up of novel nanocomposites production on an industrial scale.

Description of a Problem?

The synthetic challenges have limited the production of new types of nanocomposite materials in the industry. Currently, these methodologies, especially the bottom-up techniques face difficulties in producing higher quantities to reach consumer demands. Therefore, the advances in the bottom-up techniques, particularly for the production of bulk quantities of novel nanostructures is important, which can make a revolution in the present and new scenario of materials and nanotechnology.

Current solutions

Among the bottom up techniques, the solvo-thermal and sol-gel methods are preferable for producing large quantities of nanostructured materials. The sol-gel methods are comparatively simple and low-cost; but still require precise control over reaction conditions and pose difficulties to obtain large quantities at industrial scale. Presently, different templates are used for the growth of nanostructures in sol-gel methods. These include the preparation of zeolites, solid layered templates, molecular sieves or polymers. In this method an important step is the formation of a Sol (solid particles in the solution). Use of surfactants and control over pH is required at this stage. Formation of sol is followed by gelation, polycondensation or polyesterification for converting gel into a solid mass entrapping sol in the gel. Drying and calcination at higher temperatures, typically around 1000° C., are used to remove surfactants and organic parts leaving behind metal or metal oxide nanopowders. Chemical reduction methods are also used in presence of reducing agents and emulsions carrying metal ions and supported over a solid template.

Nanomaterials for catalysis applications

Catalysis is a key technology for achieving sustainable processes in chemical, pharmaceutical and material industry. Notably, more than 80% of all chemical products are made via catalysis. For decades, the precious metal-based catalysts modernized organic synthesis from academic labs to industrial production. However, these precious metals are less available, higher in price and exhibit significant toxicity. Therefore for the modern-state-of the-art catalysts, the developments of earth abundant metal-based catalysts continue to be highly important owing to their abundance, lesser price and low toxicity. In recent years number of homogeneous catalysts based on earth abundant metals have been developed for the selective reactions. However, these homogeneous complexes are rather sensitive and/or incorporate sophisticated (synthetically demanding) ligand systems, which are difficult to separate, form the reaction products and are rarely recycled. In contrast, heterogeneous catalysts are extremely stable and can be easily recycled, that are important for the advancement of cost-effective and sustainable industrial processes. Unfortunately, majority of the known heterogeneous catalysts work under drastic conditions and are less selective for the refinement of complex and structurally diverse molecules. In this regard, more progress is required on the development of heterogeneous catalysts. Among heterogeneous materials, the nanocatalysts are of prime importance due to their higher reactivity, selectivity and low energy consumption.

Applicants' solution to the problem

Herein we report a very simple and facile sol-gel method for the synthesis of bi-metal nanostructured materials based on non-noble metals (Fe, Co and Sn) and titanium. Our method involves the synthesis of mixed metal nanoscale composites using low cost precursors, which allows for the synthesis of desired nanocomposite materials with self-scarifying cheaper titanium or silica supports. This procedure does not require any surfactant or any need of pH controlled step. Applicants' method involves the in-situ generation of precursors and their simultaneous entrapment in the gel. This simple one pot synthesis method allows for the synthesis of homogenous size, shape and distribution of targeted nanostructures. Further, this methodology can be applied for the preparation of various nanocomposite materials using different choice of metals and self-scarifying supports. As an example, we prepared Fe, Co and Sn based different nanocomposites with Ti. We also showed the Pd, the noble metal based nanocomposite is also possible. Notably, these materials exhibit excellent catalytic applications for the selective reduction of nitroarenes (Fe—Ti nanocomposite) and for the water splitting (Pd—Ti and Sn—Ti nanocomposite).

Experimental

Synthesis of Nanocomposites

Metal compounds, as precursors of metal composite materials were added in tetrahydrofuran (THF) and polymerization of THF was initiated by addition of a small quantity triflic acid (TFC) as shown in equation I. No other oxidizing, reducing agent or any surfactant was required. Slow polymerization of THF was allowed out at room temperature. Once gel was formed reaction, mixture was transferred in crucibles and transferred into a furnace. The temperature was raised to 500° C. with a rate of 4° C. per minute and held there for 2 hours.

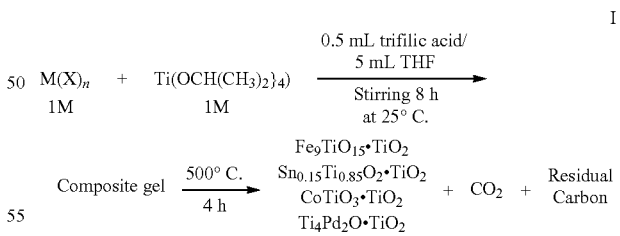

I

Where M=Fe, Sn, Co, Pb or any other metal, X=halide, or any organic ligand such as acetylacetonate and pentadienyl. Similarly, Metal-Silicon nanocomposites are prepared.

Proposed Mechanism

TFC used in excess it effects the molecular weight of polymer and synthesis of crown ether oligomers within the reaction matrix. TFC being a non-2ydrolyzable protonic acid can lead to a very high molecular weight poly-THF through a ring opening and chain coupling reaction as shown in the Scheme 1.

The mechanism of polymerization of THF by TFC has been studied expensively over the last 60 years. TFC not only polymerizes THF to a high molecular weight polymer but also yields macrocyclic crown-ether oligomers (predominantly 35-crown-7 cyclic haptamer-shown in Scheme 2) trapped inside poly THF.

It is anticipated that metal ions make complexes with crown ethers, which are trapped inside the polymer matrix and are homogenously distributed with constant stirring. This results in a metallic gel type material as shown in Scheme III. When the resulting metallic gel is decomposed by heating and calcinating at 500° C. for 2 hours, it yields mixed metal composite materials depending upon the precursors used. Supports can directly be added in the THF solution or can be generated in-situ by using their corresponding precursors. We successfully synthesized nanocomposites over titania, silica and alumina.

Catalytic Reduction of Nitroarenes to Anilines:

The oven dried 25 mL ACE pressure tube was charged with magnetic stir bar and 0.5 mmol nitroarene followed by the addition of 2 mL THF. Then, 5-7 mg of Fe-based catalyst and 2.5 mmol of hydrazine hydrate were added sequentially and the pressure tube was flushed with argon. The pressure tube was then closed with screw cap and placed in the preheated aluminium block (100° C.) and the reaction was allowed to progress for 15-18 hr at 100° C. After completion of the reaction, the pressure tube was removed from the aluminium block and cool to room temperature. After cooling down the pressure tube to room temperature, the cap was opened and 100 µL hexadecane as internal standard was added. The catalyst from the reaction mixture was filtered of by the plug of silica and the reaction products were submitted to GC and GC-MS analysis. The products were analysed using GC and GC-MS spectral analysis.

Photoelectrochemical Studies

The photoelectrochemical measurements are carried out by a conventional three electrode system in 1M $Na_2SO_4$ (pH=7) as supporting electrolyte. Working electrode was FTO glass coated with 200 µL of 2% nafion suspension of the desired catalyst, Pt gauze served as auxiliary electrode and the standard Ag/AgCl/3M KCl as reference electrode (SCE). All the photoelectrochemical experiments were performed at Metrohm Autolab Potentiostat (PGSTAT302N) instrument. For solar light in laboratory Oriel sol 3A class AAA solar simulator-Newport with following specifications was used; power 100 mW·cm$^{-2}$ (1 Sun), IEC/JIS/ASTM certified containing 450 Watt Xenon lamp, Air Mass 1.5G Filter, UV cut off filter and 2×2 inch aperture for output beam.

The main features, advantages and benefits of Applicants' solution over the current solutions?

Main Features

Heterometallic nanocomposite materials of desired combinations and structures were synthesized in a straight forward and convenient methodology. The method can be used for the synthesis of bulk quantities unlike chemical vapor deposition or sputtering techniques where the sophisticated instrumentation is required. Furthermore, metal content, composition, size and shape of nanoparticles can be precisely controlled. These materials are characterized by powder X-ray diffraction, X-ray photoelectron spectroscopy (XPS), scanning electron microscopy (SEM), transmission electron microscopy (TEM), energy dispersive spectroscopy (EDS) and electron paramagnetic resonance (EPR).

FIG. 2A displays XRD patterns of nanocomposites synthesized. Pure $Fe_9TiO_{15}$ was prepared when iron and titanium precursors were used in 9:1 ratio. $Fe_9TiO_{15}$ was characterized by, JCPDS File no. 054-1267, with the presence of peaks at 2θ=33.16 (1 0 4), 35.64 (1 1 0), 54.08 (1 1 6), 62.44 (2 1 4) and 64.01 (3 0 0).

$Fe_9TiO_{15}$.$TiO_2$ composite was synthesized using 1:1 ratio of iron and titanium. Calcination of the resultant gel at 500° C. yielded $Fe_9TiO_{15}$.$TiO_2$ composite. Here, $TiO_2$ present as a the self-scarifying support for iron nanoparticles was all in nanostructured anatase phase Which characterized by major peaks at 2θ=25.28° (1 0 1) and 48.05° (2 0 0) (JCPDS File no. 21-1272)), while Fe9TiO15 was characterized by, JCPDS File no. 054-1267, with the presence of peaks at 2θ=33.16 (1 0 4), 35.64 (1 1 0), 54.08 (1 1 6), 62.44 (2 1 4) and 64.01 (3 0 0). All other small peaks also belonged to either $Fe_9TiO_{15}$ or anatase $TiO_2$. The crystallite sizes determined by Debye-Scherrer method for $Fe_9TiO_{15}$ were calculated from XRD spectra and were in the range 11.5-18 nm. TEM images at low resolution showed diameter of most of the particles in between 10-36 nm which infers that nanoparticles consist of 1-2 crystallites. XRD patterns of other nanocomposites are shown in FIG. 2A. Just like $Fe_9TiO_{15}$, other composites also showed XRD in good agreement with the literature and thus synthesis of high crystallinity and purity of nanocomposites.

SEM micrographs show a porous architecture while EDX elemental mapping shows well dispersed Fe and Ti metals present in the vicinity of each other.

HRTEM images show high crystallinity of the particles and anatase-$TiO_2$ particles can be differentiated from $Fe_9TiO_{15}$ nanoparticles by measuring the distance between fringes as shown in FIG. 3. $Fe_9TiO_{15}$ have a distance of 0.236 nm between well-defined fringes while $TiO_2$ particles have 0.33 nm intra-fringes distance.

Advantages and benefits

Inexpensive method

This method is novel, simple and cost-effective for the production of variety of nano-composite materials. Remarkable this protocol can be scaled up to the industrial production of the new nanostructured materials. Further, this method provides an economical and suitable alternative route to the existing expensive methods for the preparation of nano-sized heterostructures.

One pot synthesis

This method is straight forward one pot synthesis and does not require sophisticated instrumentation or specialized chemicals.

Diverse Range of Nanostructures

Further, this method can be applied for the preparation of variety of nanocomposite materials with different choice of metals and self-scarifying supports.

Homogenous Size and Distribution

Nanostructures prepared by this method were homogeneous and spherical in shape. A good agreement was found between particle size determined by TEM and crystallite size determined by Debye-Schererr method from XRD results.

Highly Reproducible Synthesis

This method is reproducible and the materials produced are highly stable.

Possible Uses for the Invention

This method allows for the synthesis of nanocomposites of desired combination and materials which are not synthesized before in their nano-form. This could be a breakthrough for different applications in nanotechnology including but not limited to catalysis, water splitting, fuel cells, super capacitors charge storage and sensing applications.

As an example, here we disclose the two catalytic applications of these materials.

Catalytic Reduction of Nitroarenes to Amines

Anilines constitute central intermediates and key precursors for the synthesis of life science molecules, dyes, materials and petrochemical derivatives. Generally, anilines have been prepared by the reduction of nitroarenes. Despite number of catalysts have been developed for this reaction, still the development of novel and selective catalysts are desired. Here our iron based nanocomposite materials exhibit remarkably activity for highly selective reduction of nitroarenes using hydrazine hydrate reducing agent, which produces water as only byproduct (FIG. 7). The catalyst shows excellent selectivity for the reduction of nitro group in the presence of other reducible moieties (nitrile, amide, ester, halides), in heterocyclic compounds and in structurally diverse molecules. Further, the nitro phenol has been selectively reduced to aminophenol in 88% yield. The presence of nitro-substituted phenols poses a major threat to vital human organs including kidneys, liver and central nervous system. Such nitro-phenols (NP) are soluble in aqueous media and are not naturally degradable. In this regard, the present method offers suitable solution for the conversion of hazardous nitro phenol containing molecules to amino phenols.

Water Splitting

Production of $H_2$ fuel by water splitting using sunlight at a semiconductor/water interface is an efficient green alternative of ever depleting fossil fuels. A lot of research efforts over the years have been devoted to find active semiconducting materials for $H_2$ production. Typically, a photoelectrochemical cell (PEC) is comprised of a p-type or n-type semiconducting material, which generate holes or electrons, respectively, at the semiconductor/water interface. In case of a p-type $H^+$ is reduced to $H_2$ after absorption of sunlight at the semiconducting electrode surface. The quest for low cost, stable and scaleable materials for PEC is highly desired for the present and future energy related issues. Herein, we developed a nanocomposite $Ti_{14}Pd_2O$ material, which showed excellent catalytic activity for $H_2$ production in presence of sunlight. The initial results are represented in FIG. 8a.

Similarly, we prepared another n-type nanocomposites $Sn_{0.39}Ti_{0.61}O_2$, $Fe_9TiO_{15}$, and $CoTiO_3$, which act as excellent water splitting material in PEC cell and preliminary results are shown in FIG. 8 (b-d). To the best of our knowledge all these nanocomposite materials have not been reported for the photochemical water splitting.

SUMMARY OF THE INVENTION

What Applicants have done is to develop a simple sol gel method for the synthesis of nanoparticles of heterometallic nanocomposite materials.

In essence, the present invention comprises and/or consists of precursors of metal composite materials added to tetrahydrofuran (THF) and polymerization of THF initiated by the addition of a small quantity of triflic acid (TFC) as shown in FIG. 1. Once the gel was formed by the reaction mixture was transferred into crucibles and crucibles transferred into a muffle furnace. The temperature was then raised to 500° C. at a rate of 4° C. per minute and held at that temperature for 2 hours.

The invention will now be described in connection with the accompanying drawings wherein like reference numbers are used to identify like parts.

DESCRIPTION OF THE DRAWINGS

The patent or application file contains at least one drawing executed in color. Copies of this patent or patent application publication with color drawing(s) will be provided by the Office upon request and payment of the necessary fee.

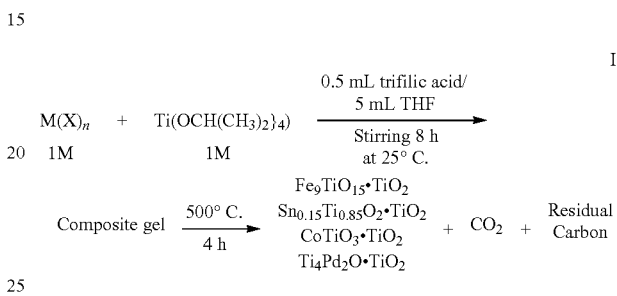

I

Figure 1:
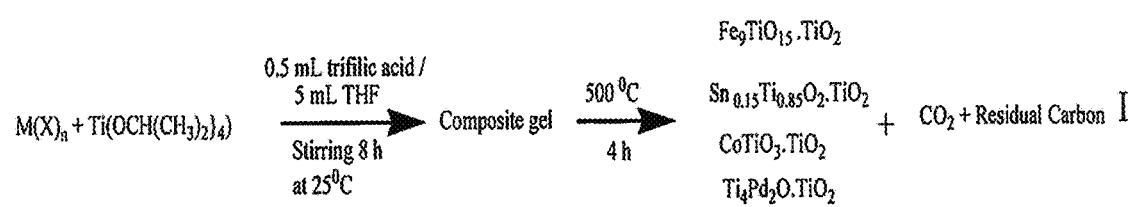
FIG. 1, metal compounds, as precursors of metal composite materials were added in tetrahydrofuran (THF) and polymerization of THF was initiated by the addition of a small quantity of triflic acid (TFC) as shown in FIG. 1. No other oxidizing, reducing agent or any surfactant was required. Slow polymerization of THF was allowed out at room temperature. Once gel was formed by reaction, the mixture was transferred into crucibles and crucibles transferred into a furnace. The temperature was then raised to 500° C. at a rate of 4° C. per minute and held at that temperature for 2 hours.
Figure 2A:
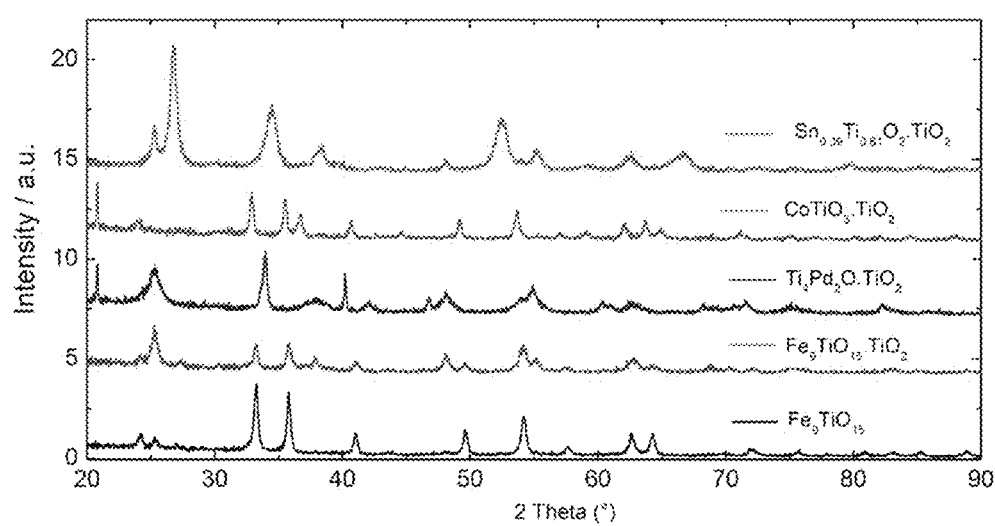
Figure 2B:
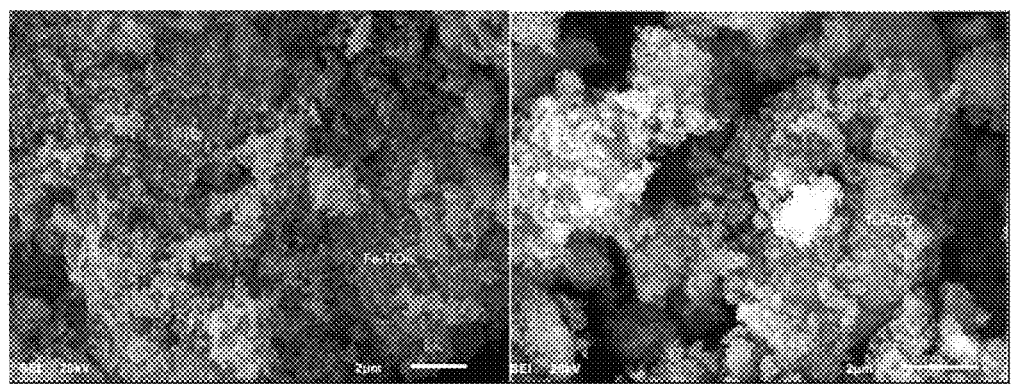
Figures 3A, 3B:
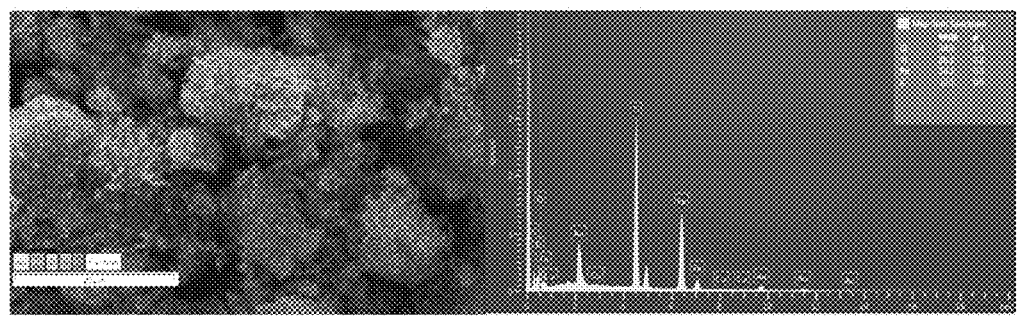
Figures 4A, 4B:
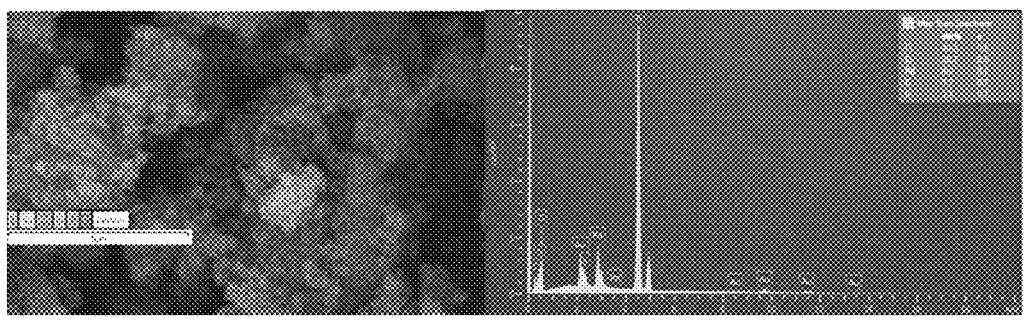
Figure 5:
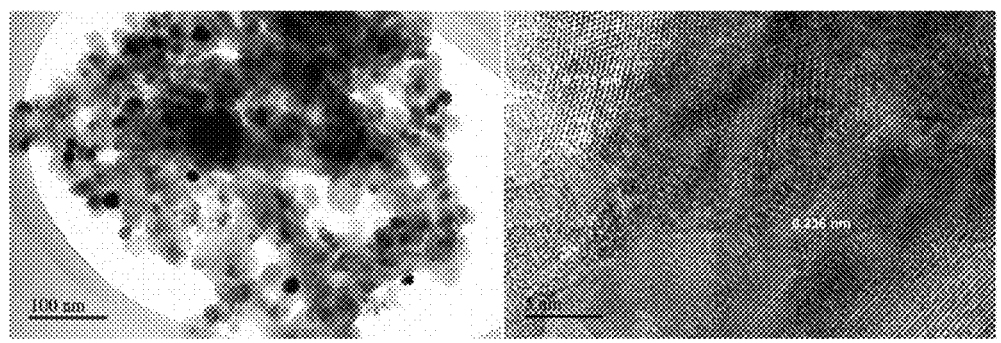
Figure 6:
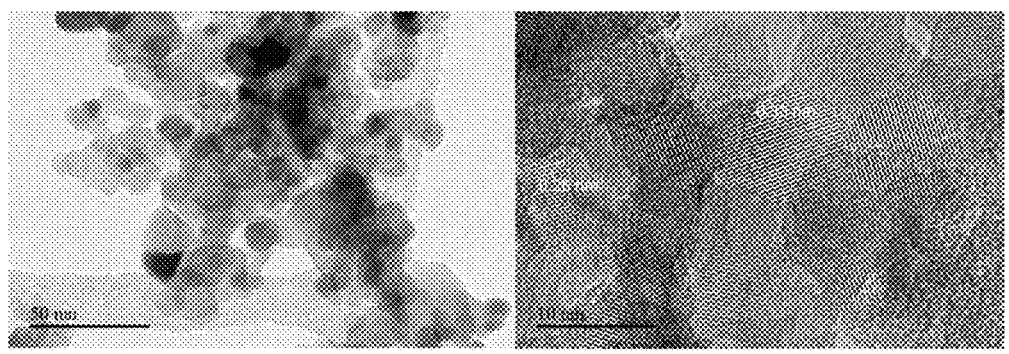
Figure 7:
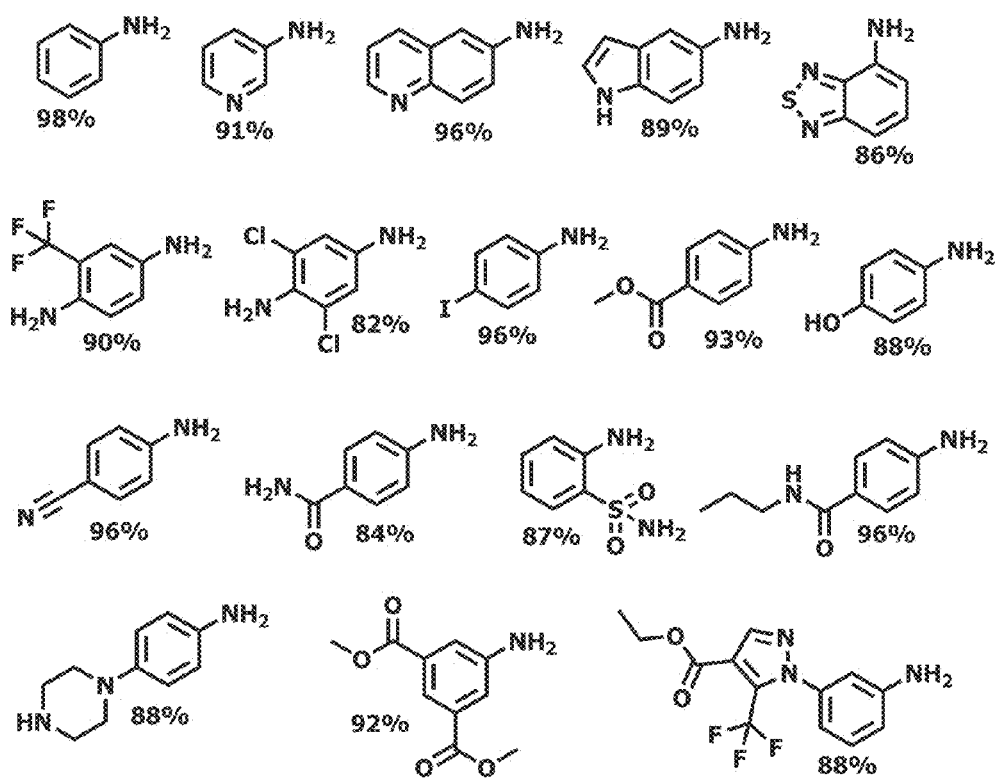
Figure 8:
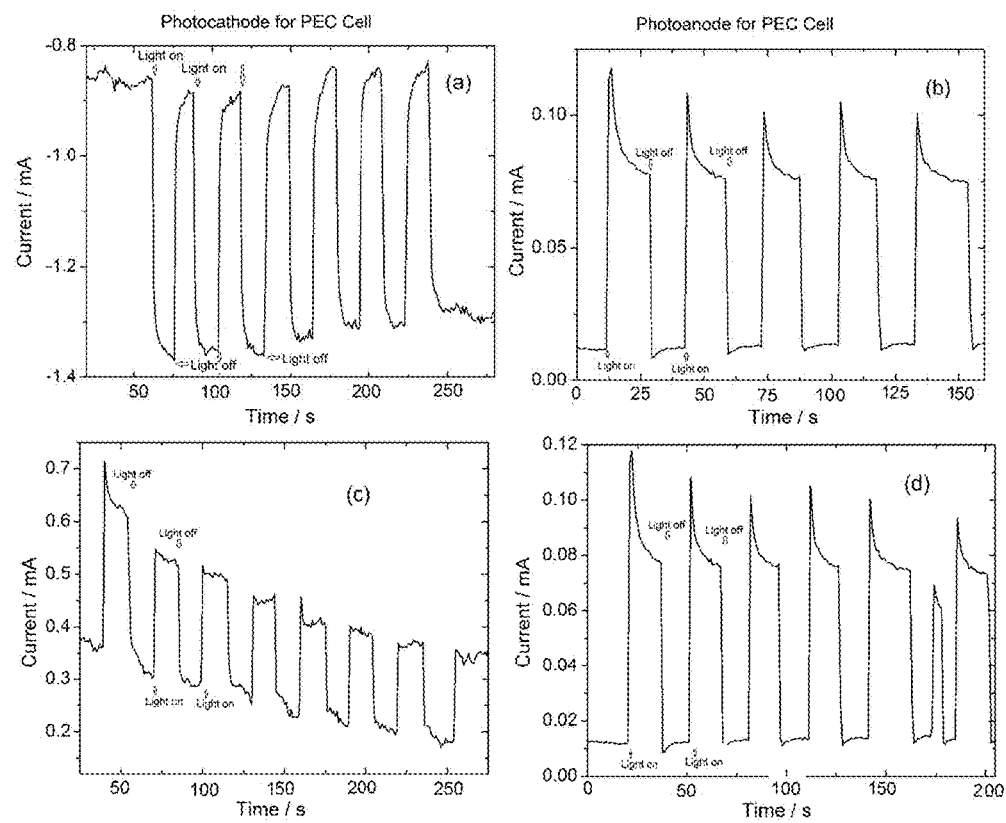

Wherein M=Fe, Sn, Co, Pb or any other metal, X=halide, or any organic ligand such as acetylacetonate and pentadienyl. Similarly, Metal-Silicon nanocomposites were prepared;

FIG. 2A illustrates the XRD patterns of the various nanocomposites calcined at 500° C. for 2 hours;

FIG. 2B illustrates SEM micrographs of $Fe_9TiO_{15}.TiO_2$ nanocomposite showing highly porous architecture;

FIG. 3A illustrates an elemental mapping;

FIG. 3B illustrates an EDS spectrum of $Fe_9TiO_{15}.TiO_2$;

FIG. 4A illustrates the elemental mapping;

FIG. 4B illustrates an EDS spectrum of $Ti_4Pd_2O.TiO_2$ nanocomposite;

FIG. 5 illustrates HRTEM images of $Fe_9TiO_{15}.TiO_2$ nanocomposite;

FIG. 6 illustrates HRTEM images of $Ti_4Pd_2O.TiO_2$ nanocomposite;

FIG. 7 illustrates Fe-catalysed reduction of nitroarenes to anilines: Reaction conditions: 0.5 mmol nitroarene, 5-7 mg catalysts, 2.5 mmol hydrazine hydrate, 2 mL THF, 15-20 h, 100° C. Yields we determined using n-hexadecane standard; and FIG. 8 illustrates current density (I)-vs Time (s) characteristics of the (a) $Ti_4Pd_2O$ photocathode, (b) $Sn_{0.6}Ti_{0.61}O_2$ (c) $Fe_9TiO_{15}$ (d) $CoTiO_3$ photoanodes recorded at 0 V in an 1 M aqueous $K_2SO_4$ electrolyte solution.

DETAILED DESCRIPTION OF THE PREFERRED EMBODIMENTS OF THE INVENTION

EXAMPLES

Applicants' methods can be applied for the preparation of a variety of nanocomposite materials with different choices of metals combinations and self-scarifying supports. Nanostructures prepared by these methods were homogeneous with well control over size and shape. These methods are highly reproducible and allow the synthesis of nanocomposites of desired combination even for composites not synthesized before in their nano-form. This could be a breakthrough for different applications in nanotechnology including but not limited to catalysis, water splitting, fuel cells, super-capacitors charge storage and sensing applications.

Metal precursors which are soluble in tetrahydrofuran (THF) are best suited for this method. Once a homogenous solution is made polymerization is initiated with triflic acid (TFC) and allowed till the formation of a gel which is then decomposed and calcined at optimized temperatures. Following are few examples for nanocomposites prepared by this method.

Example 1

Synthesis of $Fe_9TiO_{15} \cdot TiO_2$ (Iron titanate). Ferrocence Ferrocene (1 g, 5.37 mM) was dissolved in 5 mL of THF, in a 20 mL glass bottle. TFC (0.2 mL, 22.6 mM) was added dropwise and slowly followed by dropwise addition of Titanium isopropoxide (1.80 μL, 0.59 mM). The reaction mixture was left on stirring for 2 hours. A gel was formed which was transferred to a crucible. The crucible containing all reaction mixture was placed in a muffle furnace. The furnace was heated to 500° C. at a rate of 4° C. per minute and kept at 500° C. for 2 hours. A solid yellow product $Fe_9TiO_{15} \cdot TiO_2$ was obtained which was characterized by XRD (FIG. 2A) and tested as catalyst for nitroarenes reduction to nitroamines.

Example 2

Synthesis of $Fe_9TiO_{15} \cdot SiO_2$ (Iron titanate at silica). Ferrocene (1 g, 5.37 mM) was dissolved in 5 mL of THF, in a 20 mL glass bottle. 0.5 g of mesoporous silica ($SiO_2$) was added as an external support, TFC (0.2 mL, 22.6 mM) was added dropwise and slowly followed by dropwise addition of Titanium isopropoxide (1.628 mL, 5.37 mM). The reaction mixture was left on stirring for 2 hours. A gel was formed which was transferred to a crucible. The crucible containing all reaction mixture was placed in a muffle furnace. The furnace was heated to 500° C. at a rate of 4° C. per minute and kept at 500° C. for 2 hours. A solid yellow product $Fe_9TiO_{15} \cdot TiO_2$ was obtained which was characterized and tested as catalyst for nitroarenes reduction to nitroamines.

Example 3

Synthesis of $Ti_4Pd_2O \cdot TiO_2$ (Titanium palladium oxide at titania). Pd(NO3)₂·xH2O (0.2 g, 0.8 mM) was dissolved in 5 mL THF followed by dropwise addition of TFC (0.2 mL, 22.6 mM) and slow addition of Ti isopropoxide (1.314 mL, 4.335 mM) at the end. The reaction mixture was stirred for 2 hours, transferred to a crucible and placed in a muffle furnace. The temperature in the furnace was raised to 450° C., at a rate of 4° C. per minute, and held for 2 hours. A solid brown product $Ti_4Pd_2O \cdot TiO_2$ was obtained and characterized by XRD (FIG. 2A).

Example 4

Synthesis of $Sn_{0.39}Ti_{0.61}O \cdot TiO_2$ (Titanium Tin Oxide at titania). $SnCl_2$ (0.5 g, 2.2 mM) and Ti isopropoxide (6.6 mM, 2.0 mL) were dissolved in 5 mL THF and its polymerization was initiated by adding 0.2 mL (22.6 mM) of TFC Like in all other experiments, the reaction mixture was stirred for 2 hours, transferred in a crucible and placed in the furnace, heated to 400° C., at 3° C. per minute, and held for 2 hours. A clay white product was obtained. XRD of $Sn_{0.39}Ti_{0.61}O_2 \cdot TiO_2$ is shown in FIG. 2A.

Example 5

Synthesis of $CoTiO_3 \cdot TiO_2$ (Cobalt titanium perovskite at titania). Cobalt acetyalacetonate (0.5 g, 1.944 mM) was dissolved in 5 mL THF, 0.2 mL (22.6 mM) of TFC was slowly added followed by dropwise addition of Ti isopropoxide (9.72 mM, 2.94 mL). After 2 h of stirring, reaction mixture was placed in a furnace, heated to 500° C. and held at this temperature for 2 hours. The product obtained was characterized by XRD (FIG. 2A).

Example 6

Synthesis of $(Mn_{2.88}Fe_{0.12})O_4$ (Hausmannite). Manganese acetate (0.5 g, 2.04 mM) was added in 5 mL THF. Manganese acetate was partially soluble in THF, however, after addition of 0.2 mL (22.6 mM) of TFC it became completely soluble. Ferrocene (0.085 mM, 0.015 g) was also added in the same solution and reaction mixture was sonicated for 10 mins followed by stirring for 2 hours. The reaction mixture was heated to 500° C., at a rate of 4° C., and calcined for 2 hours before slowly cooling it down. XRD of $(Mn_{2.88}Fe_{0.12})O_4$ is represented in FIG. 7.

Example 7

$MnFeO_3$ (Bixbyite). $MnFeO_3$ pervoskite was synthesized by dissolving manganese acetate (0.5 g, 2.04 mM), TFC (0.2 mL, 22.6 mM) and ferrocene (0.38 g, 2.04 mM,) in 5 mL THF as described in the previous experiment. The reaction mixture was heated to 500° C., at a rate of 4° C., and calcined for 2 hours. The product was characterized by XRD (FIG. 7).

Example 8

Synthesis of $Fe_{1.696}Ti_{0.228}O_3 \cdot TiO_2$ (Iron Titanium Oxide at titania). Ferrocene (1 g, 5.37 mM) was dissolved in 5 mL of THF, in a 20 mL glass bottle. TFC (0.2 mL, 22.6 mM) was added dropwise and slowly followed by dropwise addition of Titanium isopropoxide (1.80 μL, 0.59 mM). The reaction mixture was left on stirring for 2 hours. A gel was formed which was transferred to a crucible. The crucible containing all reaction mixture was placed in a muffle furnace. The furnace was heated to 500° C. at a rate of 4° C. per minute and kept at 500° C. for 4 hours. XRD of $Fe_{1.696}Ti_{0.228}O_3 \cdot TiO_2$ is shown in FIG. 7.

Example 9

Synthesis of $Ni_{1.43}Fe_{1.7}O_4$ (Trevorite), and $Ni_{1.43}Fe_{1.7}O_4 \cdot TiO_2$ (Trevorite at titania) nanocomposites. For $Ni_{1.43}Fe_{1.7}O_4$ synthesis, Nickel acetylacetonate (1.946 mM, 0.5 g) and ferrocene (1.946 mM, 0.36 g) were dissolved in 5 mL of THF followed by addition of TFC (0.2 mL, 22.6 mM). The reaction mixture was stirred for 2 hours and resulting gel was transferred to a crucible and placed in a muffle furnace. The furnace was heated to 500° C. at a rate of 3° C. per minute and kept at 500° C. for 3 h. $Ni_{1.43}Fe_{1.7}O_4 \cdot TiO_2$ nanocomposite was synthesized by repeating the above procedure after adding 0.5 g of $TiO_2$ in the reaction mixture. XRD (FIG. 7) and Rietveld (RIR) analysis (FIG. 8) showed the successful synthesis of nanocomposites in the desired ratios.

While the invention has been defined in accordance with its preferred embodiments, it should be recognized that changes and modifications may be made therein without departing from the scope of the appended claims.

What is claimed is:

1. A sol-gel method for synthesizing nanoparticles of heterometallic nanocomposite materials, the method comprising:
 preparing a reaction solution comprising
  a first mass of tetrahydrofuran (THF),
  a second smaller mass of triflic acid (TFC),
  a metallic precursor $M(X)_n$, wherein M is a metal selected from the group consisting of Fe, Sn, Ni, Mn, Co, Pb, Pt, Pd, and mixtures thereof, and further wherein X is selected from the group consisting of halides and organic ligands, and
  a titanium precursor, a silicon precursor, or a mixture thereof;
 exposing the reaction solution to reaction conditions sufficient to induce polymerization of the THF;
 maintaining the reaction conditions for a reaction time sufficient to allow the reaction solution to form a gel;
 heating the gel to a calcination temperature; and
 maintaining the gel at the calcination temperature for a calcination period sufficient to obtain $M_xTi_yO_z.TiO_2$ nanocomposites, $M_xTi_yO_z.SiO_2$ nanocomposites, or mixtures thereof.

2. The method for synthesizing nanoparticles of heterometallic nanocomposite materials according to claim 1, wherein:
 the metallic precursor is ferrocene ($Fe(C_5H_5)_2$) and the titanium precursor is titanium isopropoxide;
 the reaction solution is stirred for the reaction period of 2 hours to form the gel;
 the gel is heated to the calcination temperature of 500° C. at a temperature ramp rate of of 4° C. per minute and held at the calcination temperature for a calcination period of 2 hours to form an iron-containing nanocomposite product iron titanite at titania ($Fe_xTi_yO_z.TiO_2$).

3. The method for synthesizing nanoparticles of heterometallic nanocomposite materials according to claim 1, wherein:
 the metallic precursor is palladium(II) nitrate hydrate $Pd(NO_3)_2.xH_2O$ and the titanium precursor is Ti isopropoxide;
 the gel is heated to the calcination temperature of 450° C. at a temperature ramp rate of 4° C. per minute; and
 maintained at the calcination temperature for a calcination period of 2 hours to produce a palladium-containing nanocomposite product palladium titanate at titania ($Ti_4Pd_2O.TiO_2$).

4. The method for synthesizing nanoparticles of heterometallic nanocomposite materials according to claim 1, wherein:
 the metallic precursor is tin chloride ($SnCl_2$) and the titanium precursor is Ti isopropoxide;
 the reaction solution is stirred for the reaction period of 2 hours to form the gel;
 the gel is is heated to the calcination temperature of 400° C. at a temperature ramp rate of 3° C. per minute; and
 held at the calcination temperature 400° C. for a calcination period of 2 hours to produce a tin-containing nanocomposite product ($Sn_{0.39}Ti_{0.61}O_2.TiO_2$).

5. The method for synthesizing nanoparticles of heterometallic nanocomposite materials according to claim 1, wherein:
 the metallic precursor is cobalt acetyalacetonate and the titanium precursor is Ti isopropoxide;
 the reaction solution is stirred for the reaction period of after 2 hours to form the gel; and
 the gel is heated to the calcination temperature of 500° C. and held at the calcination temperature for a calcination period of 2 hours to obtain a cobalt containing nanocomposite product ($CoTiO_3.TiO_2$).

6. The method for synthesizing nanoparticles of heterometallic nanocomposite materials according to claim 1, wherein:
 the metallic precursor is ferrocene ($Fe(C_5H_5)_2$) and the titanium precursor is titanium isopropoxide;
 the reaction solution is stirred for the reaction time of 2 hours to form the gel;
 the gel is heated to the calcination temperature of 500° C. at a temperature ramp rate of 4° C. per minute; and
 the gel is maintained at the calcination temperature for a calcination period of 4 hours to obtain an iron-containing nanocomposite product iron titanium oxide at titania ($Fe_{1.696}Ti_{0.228}O_3.TiO_2$).

7. The method for synthesizing nanoparticles of heterometallic nanocomposite materials according to claim 1, wherein:
 the metallic precursor includes both nickel acetylacetonate and ferrocene and the titanium precursor is titanium dioxide;
 the reaction solution is stirred for the reaction period of 2 hours to form the gel;
 the gel is heated to the calcination temperature of 500° C. at a temperature ramp rate of 3° C. per minute; and
 maintained at the calcination temperature for a calcination period of 3 hours to obtain a nickel and iron-containing nanocomposite product Trevorite at titania ($Ni_{1.43}Fe_{1.7}O_4.TiO_2$).

8. The method for synthesizing nanoparticles of heterometallic nanocomposite materials according to claim 1, wherein:
 the metallic precursor is ferrocene and the titanium precursor is titanium isopropoxide;
 the reaction solution further comprising a silicon precursor, mesoporous silica ($SiO_2$);
 the gel is heated to the calcination temperature of 450° C. at a temperature ramp rate of 4° C. per minute; and
 held at at the calcination temperature for a calcination period of 2 hours to obtain an iron-containing nanocomposite product iron titanite at silica ($Fe_xTi_yO_z.SiO_2$).

9. A sol-gel method for synthesizing heterometallic nanoparticles, the method comprising:
 preparing a reaction solution comprising
  a first mass of tetrahydrofuran (THF),
  a second smaller mass of triflic acid (TFC), and
  a first metallic precursor $M1(X)_n$, wherein M1 is a metal selected from the group consisting of Fe, Sn, Ni, Mn, Co, Pb, Pt, Pd, and mixtures thereof, and further wherein X is selected from the group consisting of halides and organic ligands,
  a second metallic precursor $M2(X)_n$, wherein M2 is a metal selected from the group consisting of Fe, Sn, Ni, Mn, Co, Pb, Pt, Pd, and mixtures thereof, wherein M2 is different than M1, and further wherein X is selected from the group consisting of halides and organic ligands, and
 exposing the reaction solution to reaction conditions sufficient to induce polymerization of the THF;

maintaining the reaction conditions for a reaction time sufficient to allow the reaction solution to form a gel;

heating the gel to a calcination temperature; and maintaining the gel at the calcination temperature for a calcination period sufficient to obtain $M1_xM2_yO_z$ nanoparticles.

10. The method for synthesizing heterometallic according to claim 9, wherein:

the first metallic precursor is nickel acetylacetonate;

the second metallic precursor is ferrocene; and the resulting nanoparticles are $Ni_xFe_yO_z$.

11. The method for synthesizing heterometallic nanoparticles according to claim 9, wherein:

the first metallic precursor is manganese acetate and the second metallic precursor is ferrocene;

the reaction solution was sonicated for 10 minutes and then stirred for a reaction time of 2 hours to form the gel;

the gel was then heated to the calcination temperature of 500° C. at a temperature ramp rate of 4° C. per minute;

the gel was held at the calcination temperature for a calcination period of 2 hours to obtain a manganese and iron containing product $((Mn_xFe_y)O_z)$.

* * * * *